(12) United States Patent
Petitgrand et al.

(10) Patent No.: US 9,060,334 B2
(45) Date of Patent: Jun. 16, 2015

(54) WIRELESS COMMUNICATION DEVICE AND POWER SAVING METHOD THEREOF

(75) Inventors: Fabien Petitgrand, Taipei (TW); Yu-Tai Chang, Hsinchu County (TW); Chao-Yuan Hsu, Hsinchu County (TW); Li-Ping Yu, Hsinchu County (TW); Tai-Li Chiang, Hsinchu County (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 294 days.

(21) Appl. No.: 13/184,610

(22) Filed: Jul. 18, 2011

(65) Prior Publication Data

US 2012/0064937 A1 Mar. 15, 2012

(30) Foreign Application Priority Data

Sep. 15, 2010 (TW) ................................ 99131266 A

(51) Int. Cl.
*H04B 7/00* (2006.01)
*H04W 52/02* (2009.01)

(52) U.S. Cl.
CPC ............ *H04W 52/0212* (2013.01); *Y02B 60/50* (2013.01)

(58) Field of Classification Search
CPC . H04W 24/00; H04W 36/08; H04W 52/0216; H04W 52/0245; H04W 76/02; H04W 68/00; H04W 28/06; H04W 28/18; H04W 36/30; H04W 48/16

USPC ........ 455/522, 69, 456.1, 436, 434, 515, 458, 455/561, 574, 552.1, 550.1, 422.1, 426.1, 455/428, 462, 442, 553.1; 370/342, 311, 370/50, 280, 441, 335, 329, 252, 328, 330, 370/347, 338, 389, 432, 208; 375/260, 340, 375/141, 149, 147, 326, 259, 368

See application file for complete search history.

(56) References Cited

U.S. PATENT DOCUMENTS

| 7,006,468 B1 * | 2/2006 | Chen et al. ..................... 370/330 |
| 7,133,380 B1 * | 11/2006 | Winters et al. ................. 370/329 |
| 2008/0014935 A1 * | 1/2008 | Rick et al. ...................... 455/434 |
| 2009/0186614 A1 * | 7/2009 | Aoyama et al. ................ 455/436 |
| 2010/0151882 A1 * | 6/2010 | Gillies et al. ............... 455/456.1 |

FOREIGN PATENT DOCUMENTS

| CN | 1451252 A | 10/2003 |
| WO | 2010079908 A2 | 7/2010 |

* cited by examiner

*Primary Examiner* — Golam Sorowar
(74) *Attorney, Agent, or Firm* — Edell, Shapiro & Finnan, LLC

(57) ABSTRACT

A wireless communication device is a mobile station of a wireless communication network system. In an idle mode, when the wireless communication device enters a startup state from a sleep state to prepare for receiving a paging message, base station (BS) measurement is performed at least once before the paging message is received.

18 Claims, 4 Drawing Sheets

WIRELESS COMMUNICATION DEVICE AND POWER SAVING METHOD THEREOF

CROSS REFERENCE TO RELATED PATENT APPLICATION

This patent application is based on Taiwan, R.O.C. patent application No. 099131266 filed on Sep. 15, 2010.

FIELD OF THE INVENTION

The present invention relates to a wireless communication device and power saving method thereof, and more particularly, to a wireless communication device and a method for arranging base station (BS) measurement in a wireless communication device before a paging message/burst is received to reduce a startup state time and power consumption.

BACKGROUND OF THE INVENTION

In a wireless network system, a user can rapidly conveniently access multiple types of network offerings via portable wireless communication devices, e.g., exchange of audio, character message, images, audio-visual (AV) multimedia, data files, e-mails and/or software and firmware programs with another user and/or a server. Therefore, the wireless network system has become an indispensable resource of the modern information society.

As the wireless network system develops, a wireless communication device for accessing the wireless network, e.g., a device for accessing a mobile phone in the wireless mobile communication network, has become one of most widely adopted consumer electronic devices. Therefore, the modern information industry is committed to improving performance of the wireless communication device.

SUMMARY OF THE INVENTION

A standby time length is a most important parameter of various performance parameters of a wireless communication device. For portable conveniences, power of the wireless communication device carried by a user is provided by a battery. In the event that the wireless communication device has a long standby time, the user need not frequently charge/change the battery.

In order to extend the standby time of the wireless communication device, power consumption of the wireless communication device needs to be reduced as much as possible provided that wireless network access operations are not affected. When the user does not access a network resource via the wireless communication device, the wireless communication device operates in an idle mode. Compared to a time for accessing the network resource, most time cost by the wireless communication device is consumed in the idle mode. Therefore, an object of the present invention is to reduce power consumption in the idle mode to effectively increase power efficiency and the standby time of the wireless communication system.

Base stations (BSs) are configured in the wireless network system, and each BS covers a cell. The wireless communication device selects one BS for registration to access the network resource via the BS. For the wireless communication device, the BS for providing the network resource assess service is a serving BS. After the wireless communication device completes registration, in the event that the network resource is not yet accessed, the wireless communication device enters the idle mode and camps in the cell of the serving BS. However, even in the idle mode, the wireless communication device still receives messages from the serving BS at regular time intervals to prepare for responding to various possible network accesses. For example, the wireless communication device receives a paging message from the serving BS at regular time intervals to determine whether there is a paging or whether it becomes a paging object of another remote wireless communication device and/or a server. When the determination result is positive, the wireless communication device is being paged and releases the idle mode to access the remote device via the serving BS; otherwise, the wireless communication device continues to stay in the idle mode.

One characteristic of the wireless network system is that ambient conditions of wireless signal transmission change, i.e., when the user carrying the wireless communication device moves, a distance between the wireless communication device and the serving BS is accordingly changed to affect the wireless signal transmission between them. Even if the distance between the wireless network device and the serving BS stays unchanged, the wireless signal transmission may also be changed due to obstacle interventions and climate changes. In order to respond to variable ambient conditions of the wireless signal transmission at any time, on top of the serving BS camped by the wireless communication device, the wireless communication device performs BS measurement on other candidate BSs at regular time intervals to measure power of wireless signals received by the wireless communication device from the candidate BSs, and estimates whether the candidate BSs can provide a better network access service according to the measured power. When one candidate BS actually provides a better network access service, e.g., wireless signals received by the wireless communication device have higher power and lower byte error rates, the wireless communication device performs re-selection to change the candidate BS as the serving BS. The candidate BSs are BSs neighboring the serving BS.

In the idle mode, the wireless communication device enters the sleep state to stop receiving any wireless signal and to reduce power consumption via a discontinuous reception (DRX) approach. However, as mentioned above, even in the idle mode, the wireless communication device also needs to perform power-consuming operations comprising releasing the sleep state at regular time intervals to receive messages and perform BS measurement. However, when a timing sequence of receiving messages and performing BS measurement is appropriately arranged, not only are regular message receiving and BS measurement normally maintained, but also more power is additionally reduced.

Operations between the wireless communication device and the serving BS are coordinated according to a predetermined time phase, which is to divide a time period in the unit of a time slot, and every predetermined number of time slots (e.g., eight) form a time frame. For example, the serving BS transmits a portion of a paging message within a predetermined time slot (e.g., a first time slot of a time frame) of a time frame every plurality of time frames, and the wireless communication device correspondingly begins to accept the paging message in this time slot. For example, in applications of the wireless mobile communication network, the serving station regards a paging block as the paging message to page the wireless communication device that needs to receive a paging. The paging block is carried in a paging channel (PCH) of a logical channel and is formed by four bursts distributed in four time frames. Each burst occupies one time slot in a time frame, and is regarded as a paging burst.

In order to smoothly receive the paging message, the wireless communication device needs to enter the normal startup state from the sleep state before the paging message is received to prepare for receiving the paging message. For example, upon receiving a first burst of the paging message in a time frame FN(i), the wireless communication device enters the startup state in a previous time frame FN(i−1). In this embodiment, the BS measurement is performed in the time frame FN(i−1), i.e., it is not necessary for the wireless communication device to perform the BS measurement after the paging burst is completely received. Since the paging burst is received in the time frame FN(i), in the event that the BS measurement is performed only after the paging burst is completely received, i.e., the paging burst is completely received and the BS measurement is completed in the frame FN(i), under such timing sequence arrangement, the wireless communication device cannot return to the sleep state only after the BS measurement is completed. In this embodiment, since the BS measurement is in advance completed in the time frame FN(i−1), the wireless communication device can rapidly return to the sleep state after the paging burst is received without maintaining the startup state in the time frame FN(i) to perform the BS measurement. Therefore, according to the present invention, a time for the wireless communication device operating in the startup state is effectively reduced thereby reducing power consumption of the wireless communication device. In an embodiment, the time for the wireless communication device operating in the startup state is reduced to 70%.

An object of the present invention is to provide a method for a wireless communication device. The method comprises the wireless communication device entering a startup state; performing BS measurement is performed before the wireless communication device receives a predetermined message, which is a paging message. The wireless communication device receives the predetermined message via a serving station.

When each BS measurement is performed, power of a wireless signal received by the wireless communication device having a predetermined frequency is measured. The predetermined frequency is a frequency for a BS broadcasting the wireless signal, and the BS is a BS neighboring to the serving BS. In this embodiment, a plurality of times (e.g., six times) of BS measurement are performed before the predetermined message is received to measure power of wireless signals respectively received by the wireless communication device from a plurality of neighboring BSs.

In an embodiment, after a burst of the predetermined message is received, the wireless communication device need not perform any BS measurement to enter the sleep state so as to complete the high power-consuming startup state as fast as possible.

Since one paging message has four bursts, when a certain wireless communication device in the cell of the serving BS is paged, various wireless communication devices collect the four paging bursts to identify the paged wireless communication device. However, it is determined whether any wireless communication device is paged in the cell provided that a first paging burst of the paging block is received.

Therefore, in an embodiment, after the first paging burst is received, the wireless communication device determines whether to continue to receive other portions of the paging message (i.e., subsequent three paging bursts) via the serving BS. When content of the first paging burst indicates that there is no wireless communication device is paged, it is determined that the wireless communication device need not receive the subsequent bursts via the serving BS, and the wireless communication device enters the sleep state while neither receive any other bursts nor perform BS measurement before entering the sleep state.

In contrast, when the first paging burst indicates that there is a wireless communication device being paged, it is determined that the wireless communication device continues to receive subsequent other paging bursts, i.e., the wireless communication device continues to receive three subsequent paging bursts to identify whether the wireless communication device itself is paged.

Another object of the present invention is to provide a method for a wireless communication device. The method comprises receiving by the wireless communication device a portion of a predetermined message (e.g., a burst of a paging message) in a predetermined time slot; and in a time frame cycle prior to the predetermined time slot, performing BS measurement once or a plurality of times via the wireless communication device. When necessary BS measurement is completed within the time frame cycle prior to the predetermined time slot, the BS measurement is stopped in a time frame cycle beginning with the predetermined time slot.

Another object of the present invention is to provide a method for a wireless communication device. The method comprises performing a prepare operation in the wireless communication device to prepare for receiving a predetermined message (e.g., a paging message); after the prepare operation is performed, performing BS measurement at least once and receiving the predetermined message. After the partial predetermined message is received and before another prepare operation is performed, the wireless communication device stops performing any BS measurement and directly enters a sleep state.

Yet another object of the present invention is to provide a wireless communication device comprising a receiving module, a timing sequence module, a control module and a frequency synthesizer. The receiving module selectively operates in a startup state and a sleep state, and comprises a front-end circuit and a power indicator. The frequency synthesizer coupled to the front-end circuit provides a frequency to the front-end circuit, which receives wireless signals having the frequency according to the frequency provided by the frequency synthesizer. The power indicator coupled to the front-end circuit measures power of the wireless signals received by the front-end circuit. The timing sequence module provides an operating timing sequence, and the control module controls operations of the receiving module according to the operating timing sequence.

The operating timing sequence of the timing sequence module triggers the control module to awaken the receiving module from the sleep state to the startup state, and triggers the control module to perform a prepare operation so as to prepare for receiving a predetermined message (e.g., a paging message). When the timing sequence module triggers the receiving module to enter the startup state, the control module controls the power indicator to perform BS measurement once or a plurality of times according to operating timing sequence, and receives the predetermined message (e.g., a burst of the paging message) via the front-end circuit.

When the power indicator performs BS measurement, the frequency synthesizer provides a broadcast frequency of a candidate BS, so that the front-end circuit receives a wireless signal broadcasted by the candidate BS, and measures power of the wireless signal via the power indicator. When the front-end circuit receives the predetermined message via the serving BS, the frequency synthesizer provides a frequency for modulating the predetermined message to the serving BS, so that the front-end circuit receives the predetermined message having the frequency.

In an embodiment, when the front-end circuit receives a first portion of a first portion of the predetermined message (i.e., a first burst), BS measurement is completed before the burst is received. Therefore, an operating timing sequence provided by the timing sequence module prompts the power indicator to stop performing any BS measurement and rapidly prompts the receiving module to enter the sleep state.

When the receiving module receives the burst, the control module performs a predetermined algorithm to determine whether to control the receiving module to continue with receiving subsequent bursts via the serving BS according to content of the burst. When the determination result is negative, the receiving module is controlled to immediately enter the sleep state, and need not receive other messages via the serving BS before the sleep state is entered.

The advantages and spirit related to the present invention can be further understood via the following detailed description and drawings.

DETAILED DESCRIPTION OF THE PREFERRED EMBODIMENT

Figure 1:
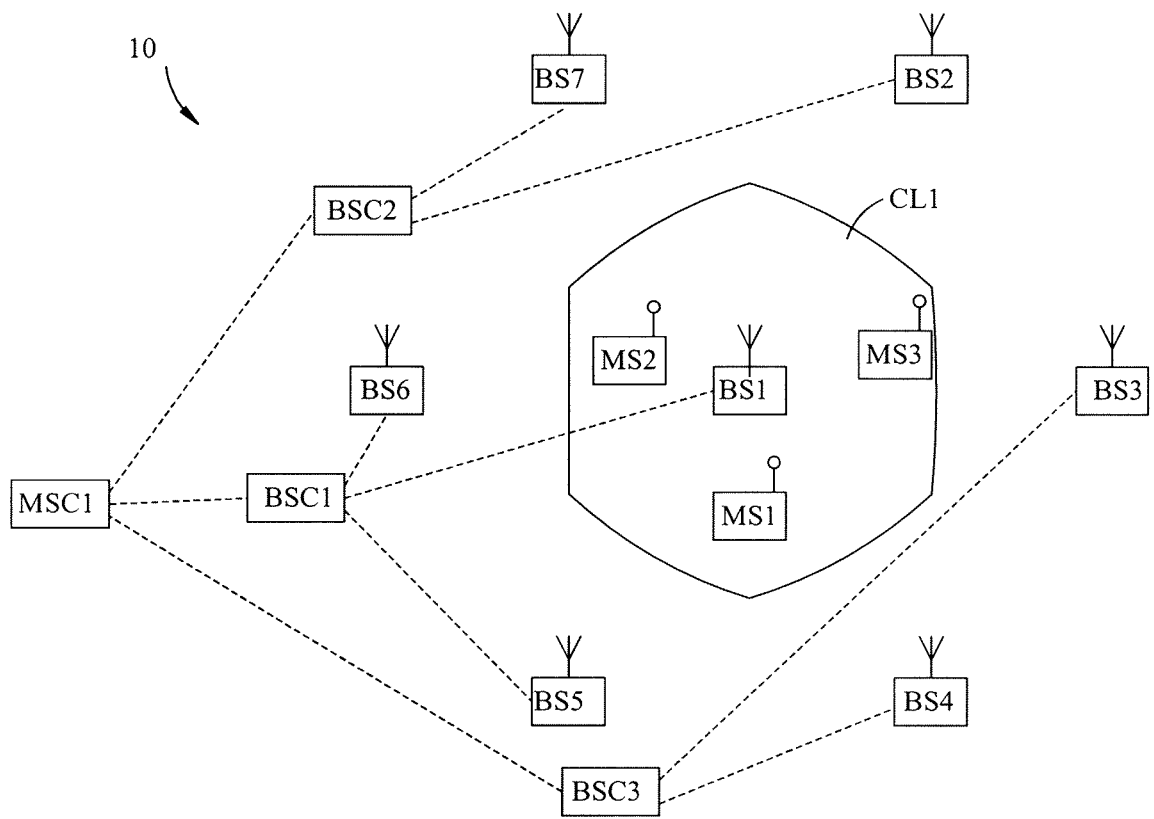
FIG. 1 is a schematic diagram of a structure of a wireless network system in accordance with an embodiment of the present invention.

FIG. 1 shows a structure of a wireless network system 10 in accordance with an embodiment of the present invention. The wireless network system 10 is a wireless mobile communication network system. A user uses a wireless communication device to access the wireless network system 10. Terminal devices MS1 to MS3 in FIG. 1 represent different wireless communication devices. In association with the wireless communication devices, the wireless network system further comprises base stations BS1 to BS7, base station controllers BSC1 to BSC3, and a mobile switching center (MSC) MSC1. Information exchange between the wireless communication devices and the base stations is performed via wireless signals. One or more base stations are integrated via a BSC to a base station subsystem (BSS). For example, in FIG. 1, the base station controller BSC1 is coupled to the BS BS1, BS5 and BS6 to form a BSS for controlling distribution of wireless frequencies between the base stations and for controlling handover procedures, and the like. The base station controller BSC2 and the base stations BS2 and BS7, and the base station controller BSC3 and the base stations BS3 and BS4 form two other base station subsystems. The base station controllers BSC1 to BSC3 are further configured to communicate with the MSC MSC1 that performs basic exchange functions.

The wireless communication devices for receiving and/or transmitting wireless signals, also called mobile stations, can be various electronic apparatuses, such as mobile phones, personal digital assistants (PDAs), car phones, portable computers associated with wireless network modems, and the like. As mentioned above, the wireless communication devices are camped in cells of serving base stations. The devices MS1 to MS3 are camped in a cell CL1 of the BS1, and other base stations BS2 to BS7 are camped in other cells that are not shown in FIG. 1. The device MS1 is taken as an example to illustrate the camping process. When the device MS1 is initialized, MS1 estimates several candidate base stations to select a base station that has a better reception. Suppose that the base station BS1 has the better reception among the candidate base stations, the device MS1 registers to the base station BS1 that provides network access service for the mobile station MS1 to access the network resources of the wireless network system 10. When the device MS1 does not access any network resource, it enters an idle mode and camps in the cell CL1 of the serving base station BS1.

The base station BS1 utilizes the allocated frequency to realize logical channels comprising a traffic channel and a control channel. When the terminal device MS1 accesses the network resources via the base station BS1, it sets up a dedicated path between the device MS1 and the base station BS1 to exchange signal data. The base station BS1 utilizes public channels of the control channel to broadcast various types of system information to terminal devices camped in the base station BS1 (e.g., the devices MS1 to MS3). For example, the base station BS1 broadcasts synchronization associated system information in a synchronization channel (SCH) of a broadcast channel (BCH), so that the devices MS1 to MS3 are synchronized with the base station BS1 in time phase. After the synchronization is complete, the terminal devices partition time in the unit of time slots, and every eight time slots form a time frame.

The base station BS1 builds a common control channel (CCCH) in the control channel, and realizes one or more paging channels in the CCCH. In each paging channel, the base station BS1 realizes a paging block in four time frames every other predetermined number of time frames (e.g., 51 BS_PA_MFRMS time frames, where BS_PA_MFRMS is system information and has a value within a range from 2 to 9). The paging block is assigned to four bursts, and each burst takes up a time slot in a time frame, where four bursts form a complete paging message. In each paging channel, the paging block periodically presents. Paging messages in different channels periodically present at different timings respectively. Each of the paging channels is assigned to plural camped terminal devices. For the terminal devices camped in the base station BS1, when a certain terminal device is being called, the base station BS1 pages the terminal device via a corresponding paging message through an assigned paging channel, so that the terminal device can receive the call after acknowledgement of the paging message. Since the terminal devices can be informed of the assigned paging channels from the system information, the related timings and durations of the paging messages are known as well.

In the idle mode, on top of periodically receiving of the paging bursts in the corresponding paging message, base station measurement is performed on other candidate base stations in response to various ambient conditions of wireless signal transmission. For example, Base stations BS2 to BS7 neighboring to the base station BS1 broadcast their own wireless signals to the terminal devices MS1 to MS3 which are camped to base station BS1. In a predetermined time period, the terminal devices MS1~MS3 perform six base station measurements with respect to the base stations BS2 to BS7 to measure power of the received wireless signals. For example, when the terminal device MS1 performs base station measurement on the base station BS2, the terminal device MS1 receives the broadcasted wireless signal from the base station BS2 at the broadcast frequency, and also measures power level of the wireless signal. In addition, the devices MS1 to MS3 respectively store the plurality of candidate BSs and their broadcast frequencies.

Figure 2:
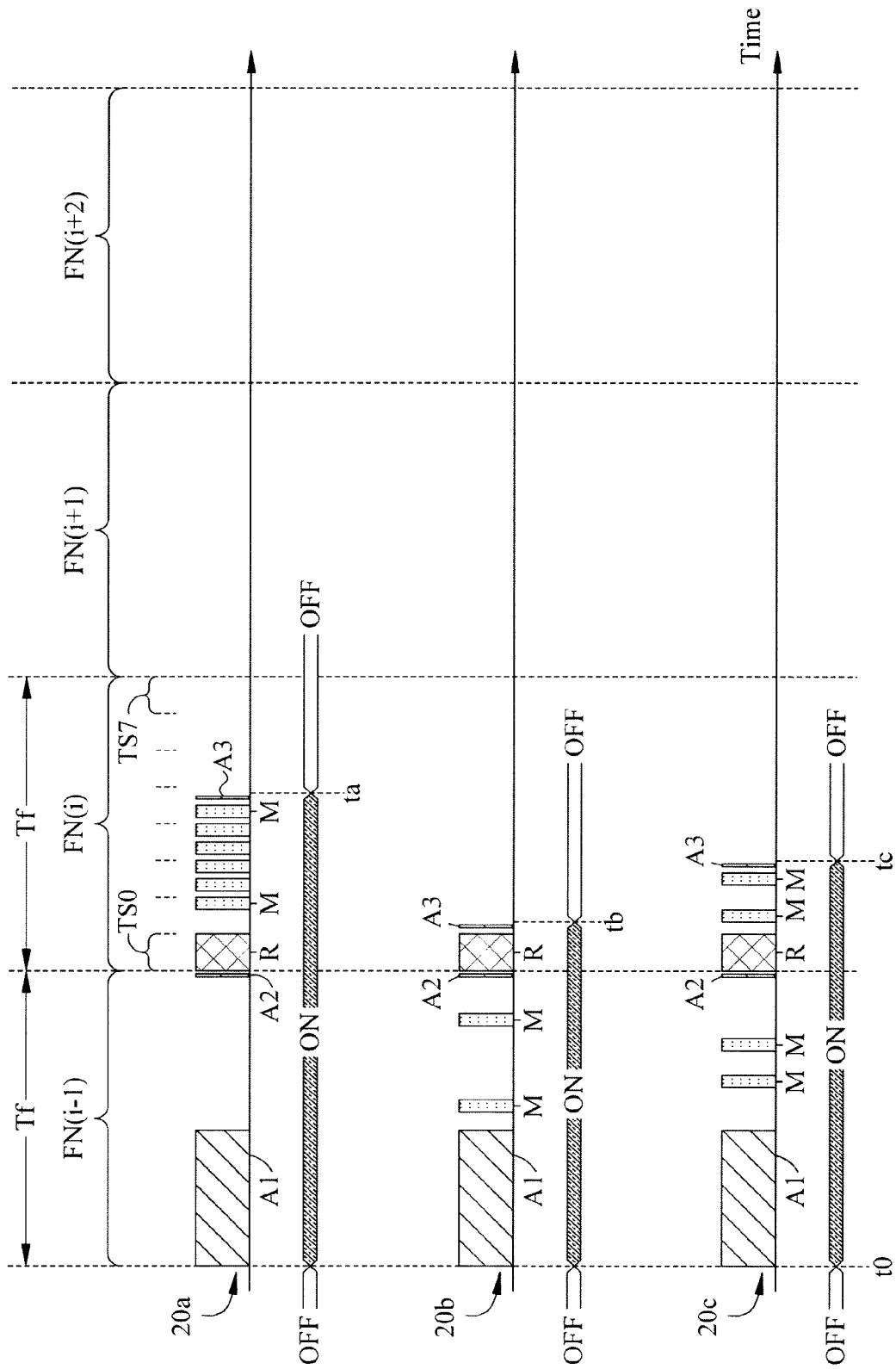
FIG. 2 is a schematic diagram of a timing sequence for illustrating advantages in accordance with an embodiment of the present invention.

FIG. 2 shows a schematic diagram of an operating timing sequence of the terminal device MS1 in an idle mode in accordance with an embodiment of the present invention. For example, in time division multiplexing (TDM) GSM system, on a time axis, the operating timing sequence of the terminal device MS1 is allotted into several time frames, such as time frames FN(i−1), FN(i), FN(i+1), FN(i+2), and the like. Each time frame duration is time frame cycle Tf. Also, each time frame is further divided into eight time slots, e.g., time slots TS0 to TS7 in the time frame FN(i).

A timing sequence 20a in FIG. 2 is a conventional operating timing sequence for paging message reception and base station measurement. In the idle mode, suppose that the terminal device MS1 receives regular paging messages in the time slot TS0 of the time frame FN(i). The terminal device MS1 is in a sleep status prior to a time point t0 (marked as "off" in FIG. 2). However, because it is desired that the burst be received in the time frame FN(i), the terminal device MS1 enters a operating status in advance in the time from FN(i−1) (marked as "on" in FIG. 2), that means the terminal device MS1 enters the operating status after the time point t0. Once the terminal device MS1 enters the operating status, the device MS1 performs an operation A1 to prepare for receiving part of the paging message (e.g., a first burst) in the time slot TS0 of the time frame FN(i), and performs base station measurement. Once the operation A1 is completed, the terminal device MS1 performs an operation A2 at the beginning of the time frame FN(i) for receiving subsequence bursts of the paging message in time frames following the time frame FN(i). In the time slot TS0 of the time frame FN(i), the terminal device MS1 performs operation R which means reception of the burst for receiving a first burst of a paging message.

In present field of the art, a terminal device is only able to begin base station measurement M after the first burst reception operation R is completed. In the embodiment of FIG. 2, after the burst reception R in the timing sequence 20a, six base station measurements M are performed with respect to powers of broadcast signals received from six candidate base stations, respectively. In this embodiment, after the base station measurement M is completed, the device MS1 performs an operation A3 to determine whether to terminate reception of the paging message. If it is not necessary to receive the remaining three bursts of the paging message, the terminal device MS1 returns to the sleep status at a time point ta. To summarize the operations in the timing sequence 20a, it is known that it is necessary for the terminal device MS1 to stay in the operating status between the time point t0 and the time point ta in order to complete at least one time message reception R and six base station measurements M.

Compared to the timing sequence 20a, timing sequence 20b represents an operating sequence that the terminal device MS1 receives burst(s) and proceeds with base station measurements. Likewise, suppose that it is set that the terminal device MS1 performs the burst reception R in the time slot TS0 of the time frame FN(i) to receive the first burst of the paging message. Accordingly, the terminal device MS1 enters the operating status from the sleep status at the time point t0, and performs the operation A1 (i.e., a prepare operation) to prepare for performing the paging burst reception and the following base station measurements. Different from the timing sequence 20a, in the operations in the timing sequence 20b in this embodiment the base station measurement M is performed before the burst reception R starts to perform, which means the base station measurement M starts prior to the time frame FN(i). In an embodiment of the present invention, the terminal device MS1 performs one or multiple times of base station measurement M between the timing of operation A1 and timing of the burst reception R.

After the multiple times of the base station measurements M are completed, the terminal device MS1 performs the operation A2 to prepare for receiving the paging message. For the time slot TS0 of the time frame FN(i), the terminal device MS1 performs the burst reception R to receive a burst from a serving base station, such as the first burst of the paging block. After the first burst is received, the terminal device MS1 performs an operation A3 to determine whether to enter the sleep status. When the determination result is positive, the terminal device MS1 enters the sleep status at a time point tb to reduce power consumption through a DRX command. For example, when the device MS1 performs the burst reception R and accordingly determines that the serving base station BS1 does not page any terminal device through a corresponding paging message, the device MS1 does not need to receive the subsequent three bursts of the same paging messages and thus enters the sleep status at the time point tb. It is noted that there are multiple well-known methods of determining whether the paging message contains real information according to the first burst.

In conclusion, for the timing sequence 20b, the terminal device MS1 maintains the operating status between the time point t0 and the time point tb to complete a burst reception R and six base station measurements M. As shown in FIG. 2, the time point tb when the terminal device MS1 enters the sleep status in the timing sequence 20b is earlier than the time point to of the timing sequence 20a, meaning that the timing sequence 20b allows the terminal device MS1 to return to the sleep status from the operating status earlier. In short, the terminal device M1 applied in the present invention has shorter operating time and thus power consumption is reduced.

Through comparison of the timing sequences 20a and 20b, according to the present invention, the timing sequence for performing the burst reception R and the base station measurement M is re-arranged (compared to the conventional arrangement) to reduce the time for the terminal device MS1 to operate in the operating status as much as possible without affecting normal operations. For the timing sequence 20b, the base station measurement M is performed in the time frame FN(i−1), and is not performed after the burst reception R is completed. In order to associate with a time for the base station BS1 transmitting the paging message defined in a system specification, it is necessary that the burst reception R be performed in the time frame FN(i). For the timing sequence 20a of the conventional application, both the burst reception R and the plurality of base station measurements M are performed within the time frame FN(i) before the terminal device MS1 returns to sleep status. For the timing sequence 20b according to the present invention, because the base station measurement M is completed in the time frame FN(i−1) earlier than the time frame FN(i), the terminal device MS1 can return to the sleep status once operation of the burst reception R is complete in the time frame FN(i), when there is no need for the terminal device MS1 to keep operating in the time frame FN(i) to perform the base station measurement M. Therefore, under the situation that the terminal device MS1 completes one burst reception R and six base station measurements M, the timing sequence 20b according to the embodiment of the present invention is more efficient in reducing the operating status and extending standby status so that the power consumption of the terminal device MS1 is reduced. In applications, by applying the timing sequence 20b, the terminal device MS1 is capable of reducing time of operating status to 70% compared to the conventional applications, and the time point tb is five to six time slots ahead of the time point ta.

A timing sequence 20c according to another embodiment of the present invention is described below. For the timing sequence 20c, when the terminal device MS1 enters the operating status at the time point t0 and completes the operation A1, terminal device MS1 performs one or more base station measurements M before performing the burst reception R. Again, the terminal device MS1 can proceed to other base station measurement(s) M after the burst reception R is complete. After the base station measurements M are complete, the terminal device MS1 performs the operation A3 to determine whether to enter the sleep status. When the determination result is positive, the device MS1 enters the sleep status at a time point tc. For example, for the timing sequence 20c, four base station measurements are done before the paging burst reception R, and two base station measurements are performed after the paging burst reception R. According to judgment from the burst received in the burst reception R, in the event that no subsequent bursts are needed, the terminal device MS1 turns into the sleep status at the time point tc. Compared to the conventional timing sequence 20a, for the terminal devices applied the timing sequence 20c, part of the base station measurements M are performed before the burst reception R, therefore the terminal device MS1 applying the timing sequence 20c is capable of reducing time of operating status so that power consumption is reduced.

Figure 3:
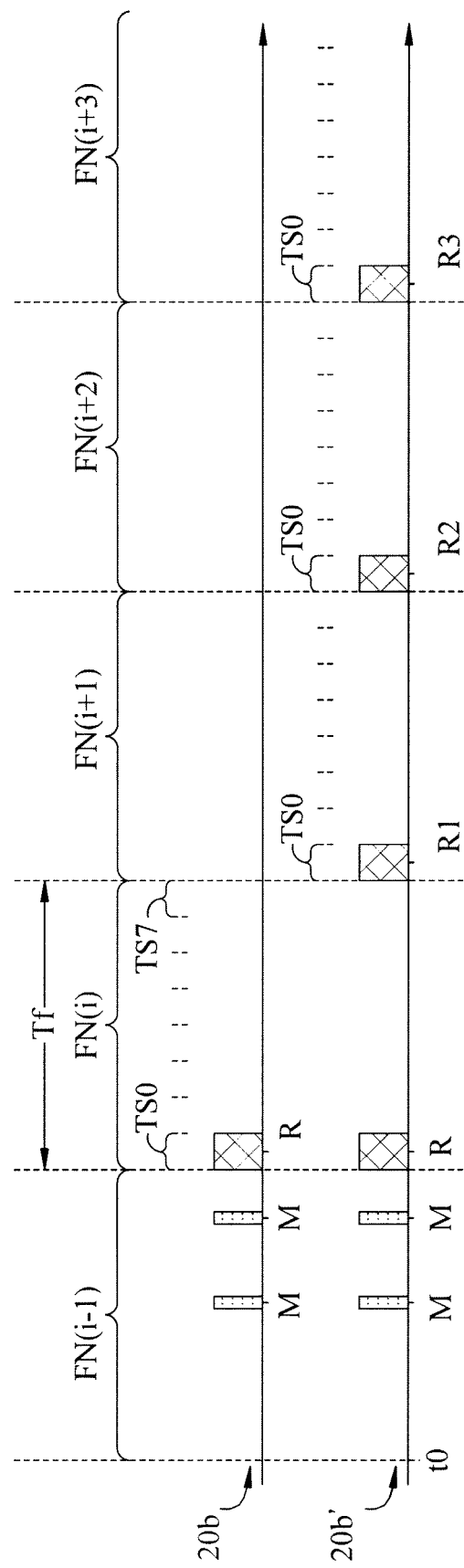
FIG. 3 is a schematic diagram of a timing sequence under different paging situations in accordance with an embodiment of the present invention.

FIG. 3 shows an operating timing sequence of different paging messages. As mentioned above, for the timing sequence 20b, a desired number of base station measurements M (other operations A1 to A3 not shown in FIG. 3) are performed before the burst reception R, and it is determined whether to receive other subsequent bursts after the burst reception R. After the burst reception R is performed, in the event that the terminal device MS1 determines that according to the received burst, no camped devices in the same paging channel are paged, the terminal device MS1 returns to the sleep status after the burst reception R is complete. When it is determined that a terminal device is paged according to the received first burst, the terminal device MS1 may receive the remaining bursts by performing subsequent burst receptions R1 to R3 in subsequent three time frames FN(i+1), FN(i+2) and FN(i+3). Thus, the paging message can be decoded from the four bursts as shown in a timing sequence 20b'. However, it is to be noted that, another embodiments of the present invention can decode the paging message by the device MS1 by two received bursts.

Figure 4:
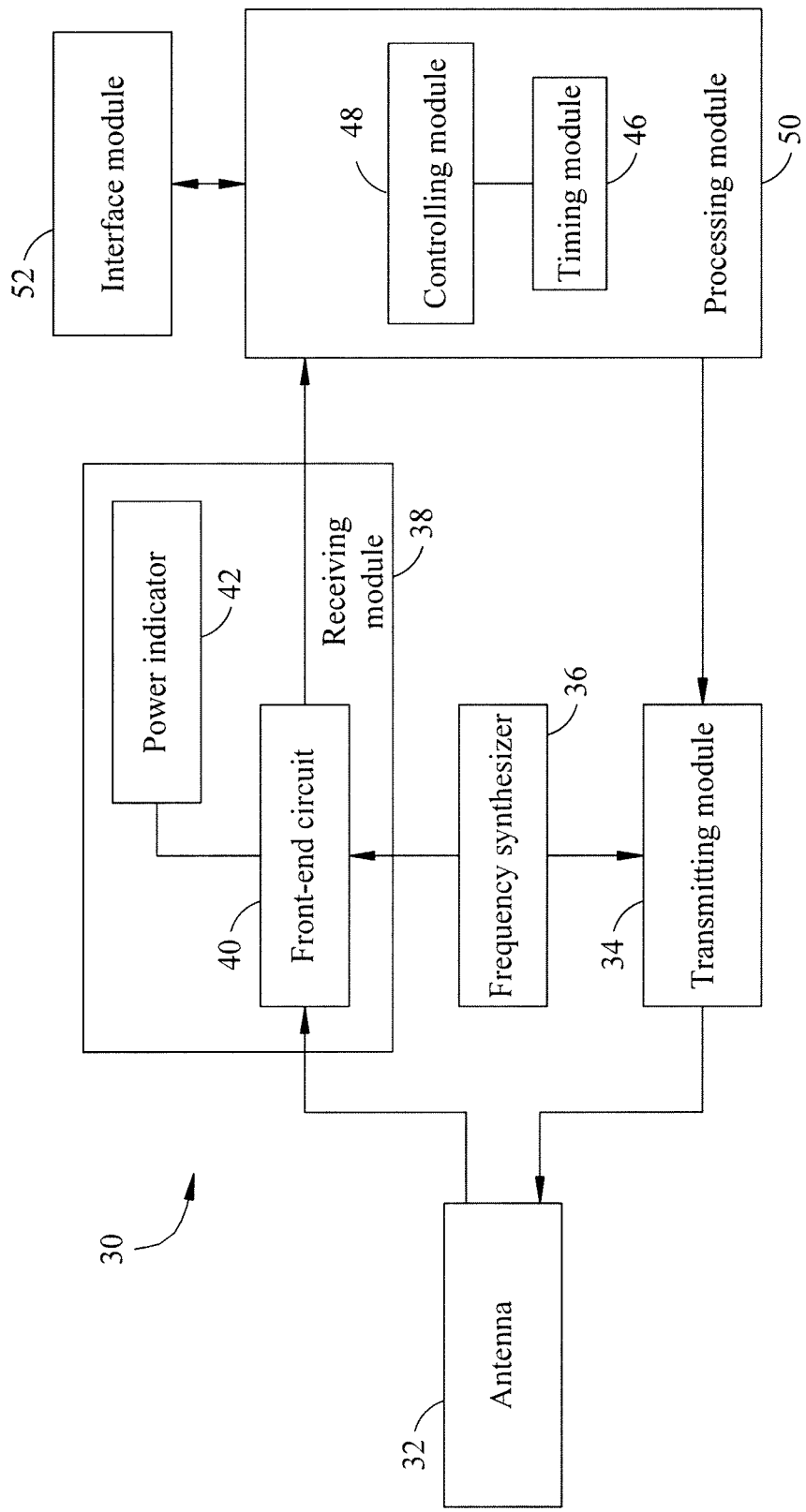
FIG. 4 is a schematic diagram of a wireless communication device in accordance with an embodiment of the present invention.

FIG. 4 illustrate a schematic diagram of a wireless communication device 30 in accordance with an embodiment of the present invention. The wireless communication device 30 is a device applied to a frequency division multiplexing (FDM) wireless network, e.g., the wireless communication device is a mobile phone of a wireless modem in a wireless mobile communication network system. The wireless communication device 30 comprises an antenna module 32, a transmitting module 34, a frequency synthesizer 36, a receiving module 38, a processing module 50 and an interface module 52. The antenna module 32 is coupled to the transmitting module 34 and the receiving module 38. The processing module 50 is coupled to the transmitting module 34, the receiving module 38 and the interface module 52. The processing module 50 comprises a timing module 46 and a control module 48 for operations of the wireless communication device 30. The interface module 52 is a user interface of the wireless communication device 30, which comprises user input/output (I/O) devices (not shown in FIG. 4), such as a keyboard, a screen, a speaker, a microphone, and/or a touch panel.

The receiving module 38 selectively operates in an operating status and a sleep status, and comprises a front-end circuit 40 and a power indicator 42. The frequency synthesizer 36 coupled to the front-end circuit 40 provides a frequency to the front-end circuit 40. The front-end circuit 40 receives a wireless signal of the frequency (i.e., a wireless signal modulated by the frequency) from the antenna module 32 at the frequency provided by the frequency synthesizer 36. The front-end circuit 40 further demodulates, converts and/or amplifies the wireless signal to a electronic signal. The power indicator 42 coupled to the front-end circuit 40 measures power of the wireless signal received by the front-end circuit 40. The timing module 46 provides an operating timing sequence, and a control module 48 controls the receiving module 38 to perform associated operations according to a dedicated operating timing sequence. Likewise, the transmitting module 34 transmits the modulated electronic signal as the wireless signal at the frequency generated from the frequency synthesizer 36 via the antenna module 32 according to frequency-modulated electronic signal.

When a user accesses a wireless network resource through the wireless communication device 30, the receiving module 38 operates in the operating status. A downlink wireless signal (e.g., a wireless signal in a traffic channel transmitted from a serving BS) transmitted to the wireless communication device 30 is received, decoded (according to a frequency provided by the frequency synthesizer 36), converted and/or amplified by the antenna module 32 and the receiving module 38 to a electronic signal that is transmitted to the processing module 50. The processing module 50 further decodes and retrieves information from the electronic signal, and transmits via the interface module 52 the information to the user and/or the wireless communication device 30 for storage. Information transmitted by the user to the wireless network remote end is inputted via the interface module 52 to the processing module 50 for decoding, and is modulated (according to the frequency provided by the frequency synthesizer 36), converted and/or amplified via the transmitting module 34 to a wireless signal in an uplink traffic channel that is transmitted via the antenna module 32. When the access of network resources ends, the wireless communication device 30 enters the idle mode.

When the user does not access the wireless network resource via the wireless communication device 30, the receiving module 38 enters the idle mode. In the idle mode, the receiving module 38 maintains the DXR status having low power consumption, and only regularly enters the operating status to receive messages from the serving base station and to perform base station measurement. The operating timing sequence for the receiving module 38 operating in the operating status is similar to the timing sequences 20b or 20c in FIG. 2. If it is desired that the burst reception R be performed in the time slot TS0 in the time frame FN(i), the operating timing sequence of the timing sequence module 46 allows the control module 48 to first awaken the receiving module 38 from the sleep status to the operating status, then the control module 48 is able to perform the operation A1, i.e., prepare for receiving a paging message. After that, the timing module 46 triggers the control module 48 to allow the power indicator 42 to perform one or more base station measurements M, and to allow the front-end circuit 40 to perform the burst reception R. Accordingly, the receiving module 38 returns to the sleep status as fast as possible to reduce power consumption.

When each base station measurement M is performed via the power indicator 42, the frequency synthesizer 36 provides a broadcast frequency of a candidate BS, so that the front-end circuit 40 receives a wireless signal broadcasted by the neighboring base station and power of the wireless signal is measured via the power indicator 42. When the front-end circuit 40 performs the burst reception R and receives a predetermined message via the serving base station, the frequency synthesizer 36 provides a frequency for modulating the predetermined message to the serving base station, so that the front-end circuit 40 receives the modulated predetermined message at the frequency.

As shown in the timing sequence 20b, in an embodiment, when the front-end circuit 40 completes the burst reception R, all of the base station measurements M are complete before the burst reception R. Therefore, the timing sequence 46 prompts the control module 48 to perform the operation A3, which is to determine whether receiving of subsequence bursts of the serving BS by the receiving module 38 is necessary according to content of the message obtained in the burst reception R. When the determination result is negative, the timing module 46 and the control module 48 prompt the receiving module 38 to enter the sleep status without receiving subsequent burst messages via the serving base station, and the power indicator 42 does not perform any base station measurement M. Therefore, the wireless communication device 30 effectively reduces the time in operating status and power consumption from burst reception and base station measurement. When the control module 48 determines to continue receiving the subsequent bursts, the operating timing sequence is arranged as the timing sequence 20b' shown in FIG. 3. The control module 48 collects fourth paging messages obtained in the burst reception R, R1 and R3 to decode whether the wireless communication device 30 has any incoming calls. When the determination result is positive, the wireless communication device 30 requires the serving base station for accessing the network resources; when the determination result is negative, the receiving module 38 returns to the idle mode. The control module 48 performs software program code to perform operations A1 to A3, i.e., the operations A1 to A3 represent software activity of the control module 48.

Since the receiving module 38/the front-end circuit 40 employs high-power radio-frequency (RF) analog circuitry, reduction of the startup state time can reduce large amount of power consumption. When the receiving module 38 enters the sleep mode, components of the control module 48/the processing module 50, for controlling the receiving module 38 enter the sleep state and associated calculation resources are released. The control module 48 and the timing sequence module 46 are realized by software/firmware integrated with hardware, e.g., a processor executing associated software/firmware program code. According to the present invention, it is determined whether to implement the timing sequence 20b or 20c according to response speeds and operation characteristics of the frequency synthesizer 36, the front-end circuit 40 and the power indicator 42. When frequency synthesizer 36, the front-end circuit 40 and the power indicator 42 complete BS measurement M in the operations A1 and A2 a sufficient number of times, the wireless communication device 30 adopts the timing sequence 20b as the operating timing sequence; otherwise, the wireless communication device 30 adopts the timing sequence 20c as the operating timing sequence.

In conclusion, compared to the timing sequence of performing BS measurement after paging burst reception in the prior art, according to the present invention, an operating timing sequence of performing burst reception after BS measurement can effectively reduce a startup state time thereby reducing power consumption as well as increasing characteristics of a wireless communication device. The wireless communication device provided by the present invention can be widely applied to various types of wireless network systems that need to regularly perform message reception and BS measurement, e.g., various types of wireless mobile communication network systems defined by European Telecommunications Standards Institute (ETSI).

While the invention has been described in terms of what is presently considered to be the most practical and preferred embodiments, it is to be understood that the invention needs not to be limited to the above embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for reducing power consumption of a wireless communication device, employed in connection with a plurality of base stations (BSs) and the wireless communication device, which selectively operates in an operating status and a sleep status, the method comprising:
   prompting the wireless communication device to enter the operating status; and
   performing a base station measurement before the wireless communication device receives a paging message,
   wherein the base station measurement is performed in a same frame in which the wireless communication device enters the operating status and no paging message is received in the same frame, and
   wherein an operation to prepare for receiving the paging message is performed only after the base station measurement is complete.

2. The method as claimed in claim 1, wherein performing the base station measurement comprises measuring a wireless signal power at a predetermined frequency, and the wireless signal is a broadcast signal from one of the base stations.

3. The method as claimed in claim 2, wherein performing the base station measurement before the paging message comprises measuring powers of a plurality of wireless signals at a plurality of predetermined frequencies.

4. The method as claimed in claim 3, further comprising:
   completing the base station measurements of the plurality of base stations before receiving the paging message.

5. The method as claimed in claim 1, further comprising:
   receiving a portion of the paging message after the base station measurement is complete; and
   determining whether to continue receiving another portion of the paging message.

6. The method as claimed in claim 5, further comprising:
   entering the sleep status when determining not to receive the another portion of the paging message.

7. The method as claimed in claim 5, further comprising:
   entering the sleep status without performing the base station measurement before the sleep status when determining not to receive the another portion of the paging message.

8. The method as claimed in claim 1, wherein the wireless device receives the paging message in an immediate next time frame after the wireless device enters the operating status.

9. A method for reducing power consumption of a wireless communication device accessing a predetermined base station according to a predetermined timing sequence, the timing sequence comprising a plurality of time slots, every predetermined number of the time slots defining a time frame cycle, the method comprising:
- in one predetermined time slot among the time slots, receiving a portion of a paging message; and
- in the time frame cycle prior to the predetermined time slot, performing at least one base station measurement,
- wherein performing the at least one base station measurement occurs in a same time frame cycle in which the wireless communication device entered an operational status from an idle status, and wherein no paging message is received in the same time frame cycle, and
- wherein an operation to prepare for receiving the portion of a paging message is performed only after the at least one base station measurement is complete.

10. The method as claimed in claim 9, wherein performing the at least one base station measurement comprises performing base station measurements a plurality of times in the time frame cycle prior to the predetermined time slot.

11. The method as claimed in claim 10, wherein performing the at least one base station measurement comprises respectively measuring powers of a plurality of wireless signals at a plurality of predetermined frequencies.

12. The method as claimed in claim 9, further comprising:
- ceasing performing any base station measurement in the time frame cycle from the predetermined time slot.

13. A wireless communication device, comprising:
- a receiving module, selectively operating in an operating status and a sleep status, the receiving module comprising:
- a front-end circuit, for receiving a wireless signal; and
- a power indicator, for measuring power of the wireless signal;
- a timing module, for providing an operating timing sequence; and
- a control module, for controlling the receiving module according to the operating timing sequence, so that after the receiving module enters the operating status, the power indicator performs at least one base station measurement and then the front-end circuit receives a predetermined message,
- wherein the at least one base station measurement is performed in a same time frame cycle in which the wireless communication device entered the operating status from the sleep status, and wherein no paging message is received in the same time frame cycle, and
- wherein an operation to prepare for receiving the predetermined message is performed only after the at least one base station measurement is complete.

14. The wireless communication device as claimed in claim 13, wherein the predetermined message is a paging message.

15. The wireless communication device as claimed in claim 13, further comprising:
- a frequency synthesizer, for providing a first frequency for the front-end circuit to receive a wireless signal at the first frequency when the power indicator performs the base station measurement, and for providing a second frequency for the front-end circuit to receive the predetermined message at the second frequency.

16. The wireless communication device as claimed in claim 13, wherein when the front-end circuit receives a portion of the predetermined message, the control module controls the power indicator to stop the base station measurement, and controls the receiving module to enter the sleep status.

17. The wireless communication device as claimed in claim 13, wherein the receiving module receives the predetermined message from a predetermined base station, and when the receiving module receives a portion of the predetermined message, the control module determines whether to receive another portion of the predetermined message according to content of the received portion of the predetermined message.

18. The wireless communication device as claimed in claim 17, wherein when the control module determines not to receive other portions of the predetermined message, the timing sequence module prompts the receiving module to enter the sleep state, and the receiving module does not receive via the predetermined BS the other portions before entering the sleep state.

* * * * *